J. E. RYAN.
LIGHT PROJECTING LAMP.
APPLICATION FILED JAN. 24, 1916.

1,257,405.

Patented Feb. 26, 1918.
2 SHEETS—SHEET 1.

Inventor:
John E. Ryan
by his attys
Crale & Hayes

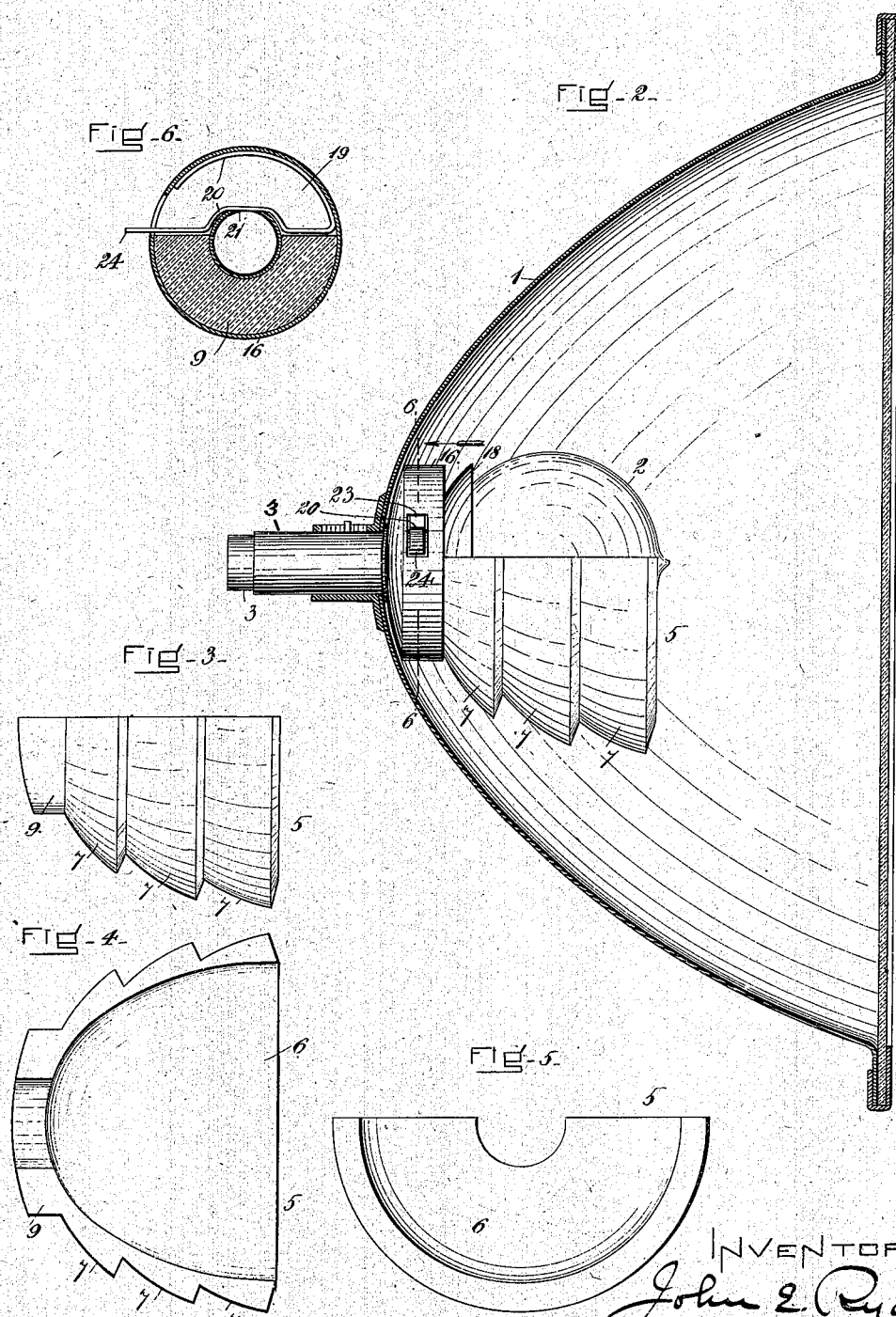

UNITED STATES PATENT OFFICE.

JOHN E. RYAN, OF BOSTON, MASSACHUSETTS.

LIGHT-PROJECTING LAMP.

1,257,405.

Specification of Letters Patent.   Patented Feb. 26, 1918.

Application filed January 24, 1916.   Serial No. 73,836.

*To all whom it may concern:*

Be it known that I, JOHN E. RYAN, of Boston, in the county of Suffolk and State of Massachusetts, a citizen of the United States, have invented a new and useful Improvement in Light-Projecting Lamps, of which the following is a full, clear, and exact description, reference being had to the accompanying drawings, forming a part of this specification, in explaining its nature.

The present invention relates to an attachment for light-projecting lamps for securing proper projection of the rays of light emanating from them. In practically all light-projecting lamps the projection of the rays of light is obtained by a mirror or light-reflecting surface arranged back of the source of light. An example of this is seen in the headlights of automobiles, to which the present invention especially pertains and which are usually provided with parabolic or spherical mirrors arranged back of the source of light. With these mirrors the lines of projection of the rays of light will depend upon the location of the source of light in relation to the mirror or reflecting surface. This may be so arranged that the rays of light reflected from all parts of the mirror may be projected forward on parallel and substantially horizontal lines. This has the advantage of effecting a restricted lighting field some distance ahead of the automobile, but it does not throw the rays of light immediately in front of the automobile, and leaves the space on either side in comparative darkness. The ground in the immediate proximity to the car and at the right and left may be lighted by so changing the location of the source of light with relation to the mirror that the rays reflected from the lower half of the mirror will be projected downwardly, but when this change is effected the angle of reflection of the rays proceeding from the upper half of the mirror is such as to cast the rays upwardly, which is especially objectionable as it fails to properly light the ground some distance ahead of the automobile, the rays being wasted, and it has a tendency, also, to blind the driver of an approaching vehicle. Other variations might be effected in the location of the source of light with relation to the mirror for effecting variation in the projection of the rays, but in every case there is objection for the reason that the mirror in itself is incapable of projecting in a proper direction or directions all of the rays emanating from it. By this is meant that some of the rays reflected from the mirror should proceed along lines substantially parallel with the axis of the reflector though preferably having a slight downward inclination so as to avoid the possibility of shining in the eyes of one driving an approaching vehicle, yet capable of lighting the ground some distance in front of the automobile. Other rays should be so projected as to cast a field of light downward away from the axis of the reflector, or, in other words, so as to strike immediately in front of the automobile and just forward of its sides at the right and left.

It is accordingly not only the object of my invention to obtain this proper projection of the rays of light emanating from the lamp, but to obtain it in such manner that all the rays of light may be utilized.

My invention can best be seen and understood by reference to the drawings in which there is shown diagrammatically an embodiment thereof applied to an ordinary electric headlight of an automobile, those parts only being shown necessary to a proper understanding of the invention and in which—

Fig. 2 is a view partly in horizontal section and partly in plan of the same parts.

Figs. 3, 4 and 5 are views, respectively, in side elevation, plan and front elevation of the refracting lens or prism forming one of the essential elements of my invention.

Fig. 6 is a section on the line 6—6 of Fig. 2.

Referring to the drawings:—

Figure 1:
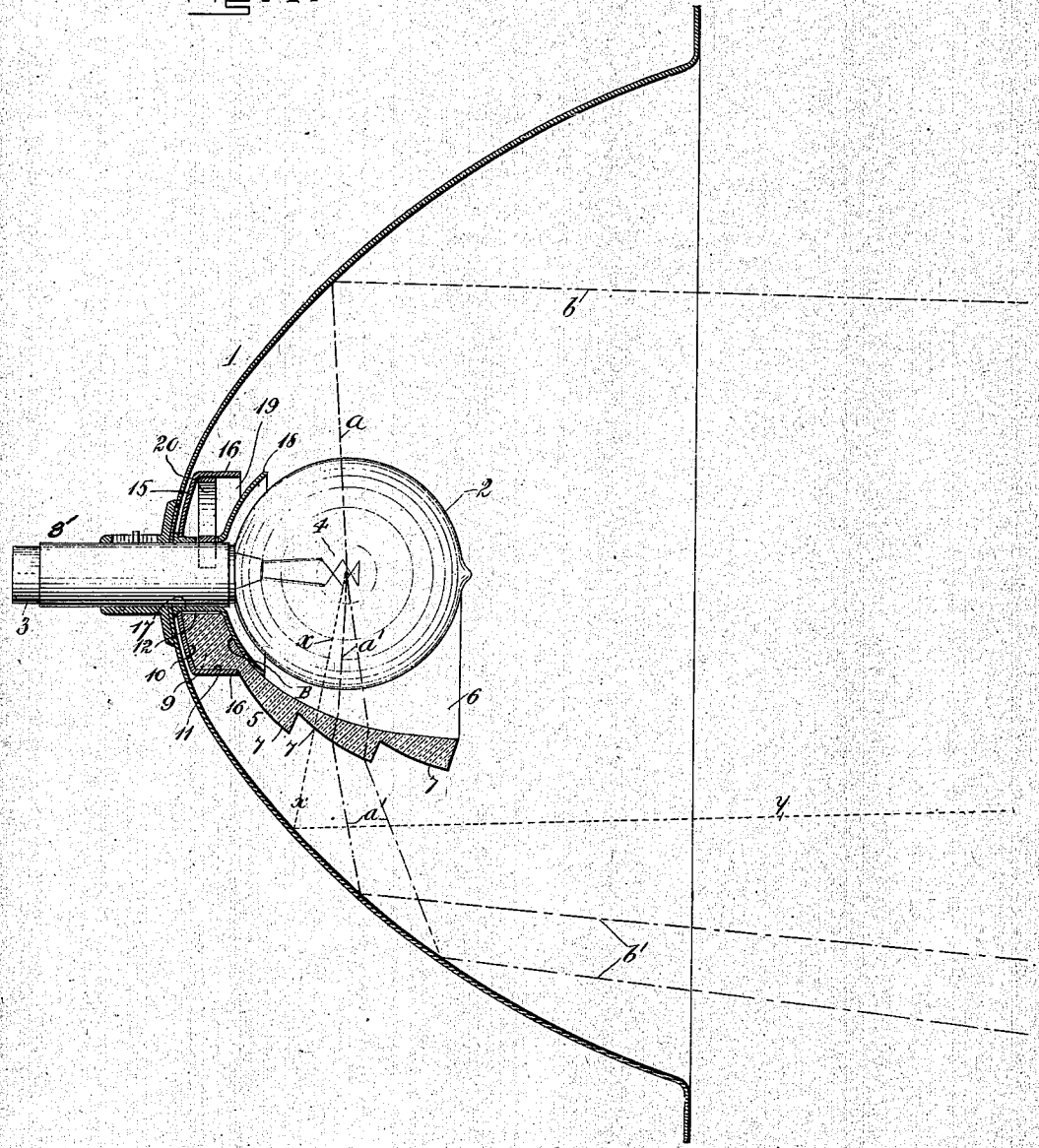
Figure 1 is a view of parts partly in longitudinal vertical section and partly in side elevation.

1 represents the parabolic mirror which is provided with the usual face plate and other associated parts (not shown). 2 is the bulb of the incandescent light. This is provided with a stem 3 contained within a socket 3', which extends back through the mirror and is secured to it in the usual manned permitting of adjustment. 4 is the filament or source of light.

Interposed between the source of light and the lower half of the mirror is a light-refracting lens 5. This lens is such that the rays from the source of light must pass through the lens before striking the lower half of the mirror and being reflected from it. The object of the lens is to change by refraction the direction of the rays emanating from the source of light or so deviate those rays that they will have a changed angle of incidence and accordingly a changed angle of reflection with relation to the lower half of the mirror from those angles of incidence and reflection which the rays would normally have if the lens were not used.

The lens can perhaps be best described in the light of its function and the ultimate result desired to be attained. In the first instance the filament or source of light is so positioned along the axis of the mirror that the rays emanating from it and reflected from the upper half of the mirror will project forward in substantially a horizontal plane though tending to have a slight angular inclination toward the axis of the mirror. This will tend to throw a field of light well in front of the lamp, none of the direct rays projecting upwardly but all, as said before, along lines substantially horizontal. The full lines $a$ and $b$ shown in Fig. 1 illustrate the direction taken by these rays after emanating from the source of light. Assuming no lens is employed, with the source of light thus positioned relatively to the mirror the rays emanating from it and striking the lower half of the mirror will be reflected therefrom along lines substantially horizontal, and some with an upward projection, which at a distance would be very objectionable. In other words, the rays from the source of light would take a course substantially as indicated in the dotted lines $x$ and $y$ of Fig. 1.

With the rays thus projected no rays are obtained having such abrupt downward inclination as would cast a wide field of light downward just in front of the mirror. It is by means of the interposition of the lens that this effect is obtained. The rays from the source of light which would strike the lower half of the mirror first pass through the lens which is made of suitable refracting material, and by it become bent or deviated so as to strike the lower half of the mirror with such an acute angle of inclination as to be reflected from the mirror with the desired downward projection, taking a course substantially as shown in the full lines $a'$ and $b'$ of Fig. 1.

The general form of the lens 5 is shown in Figs. 3 to 5, inclusive. It will be seen that the lens extends around that portion of the bulb lying between the source of light and the lower half of the mirror so as to intercept all the rays striking the lower half of the mirror. For this purpose the lens is rounding, arranged so as not to contact with the bulb, and so disposed that as the rays are reflected from the lower half of the mirror they will not be again intercepted by the lens. I prefer that the lens be so arranged that the interior surface 6 thereof be so inclined throughout its length that the rays of light will strike this surface at other than a right angle, or so as not to pass directly through the refracting lens and be deviated only from the outer surface thereof. It is desirable, also, that the lens have the general form of a refracting prism with the inner and outer surfaces bounding the body of the lens inclined to each other.

To avoid excessive weight in the lens and yet obtain the necessary inclination of its outer surface, I prefer that the inner surface be continuous and the outer surface made up of a series of short inclined step-forming surfaces 7 substantially as shown. The lens is made of glass or other suitable transparent and refracting medium. Owing to the difference in the quality and composition of glass, its refractive index will vary, and accordingly it is impossible to describe the exact angular formation of the lens, for this will depend upon the kind of glass used and its index of refraction, the form of the mirror and the results desired to be attained. In practice I have found that by the employment of a lens capable of bending all the rays 8 or 9 degrees from the normal excellent results are obtained. Owing to the different sizes of mirrors, care should also be taken that the lens be long enough to intercept and bend all the rays that would naturally contact with the lower half of the mirror.

The lens may be supported in any suitable manner. Inasmuch, however, as the lens is especially applicable to automobile headlights having a parabolic mirror and electricity as the source of light, I have accordingly shown a convenient method of mounting the lens when used in such connection and by which it is readily attachable to any headlight of this type.

The method consists in attaching the lens to the lamp socket 3' in which is contained the stem 3 to the bulb of the electric lamp. This is accomplished by means of a casing to which the lens is secured and which casing in turn is releasably attached to the lamp socket so that the refractor will be mounted on the socket between the light source and the reflector.

In order that the casing may be secured to the lens, the lens is provided at the rear thereof with a thickened portion or butt 9. This butt is segmental in form and is bounded by the surfaces 10, 11, 12 and 13, respectively.

The casing to which the lens is secured comprises in part an annular plate 15 which forms the rear portion or back of the casing. This is provided with a turned edge or rim 16. The casing comprises also an inside tubular portion 17. This extends through the central hole or opening in the back plate 15 and is secured to it by crimping or upsetting the rear end of the tube against the outside of the plate substantially as shown in Fig. 1. The forward edge of the tube 17 is provided with an annular outwardly-flaring flange-forming portion 18. The portions 15, 16, 17 and 18 of the casing engage, respectively, the surfaces 10, 11, 12 and 13 of the butt of the lens. In other words, the butt fits snugly within these portions of the casing. The attachment between the casing and the lens is secured by first applying the two separate parts of the casing above referred to to the lens. When this application is made the rear end of the tubular portion 17 of the lens will project through the hole in the rear plate 15 of the casing and the attachment between the casing and the butt of the lens is then secured by the crimping or upsetting of the end of the tube 17 against the plate 15 of the casing as above described.

The lens is secured to the lamp by passing the lamp socket through the tubular portion 17 of the casing after which the lamp socket is secured to the mirror in the usual manner.

To prevent the casing and lens carried by it from turning on the lamp socket provision is made as follows:—

Owing to the segmental form of the butt of the lens and to the annular form of the casing a cavity 19 will be left in that portion of the casing lying above the lamp socket when the parts are in place. Within this cavity there is placed a spring 20 consisting simply of a strip of bent spring metal one portion of which bears against the interior of the portion or rim 16 of the casing, with another portion bearing against the lamp socket. In this connection it will be observed that the tube 17 is cut away in part at 21 to admit of the direct bearing of the spring against the socket. From the point of its bearing against the lamp socket the spring extends back and outward through a slot 23 formed in the outer wall or rim 16 of the casing, the parts then assuming a position substantially as shown in Fig. 6 with the end 24 of the spring projecting beyond the wall of the casing. The projecting end 24 of the spring provides a finger piece by which one may bend and lift the operating arm of the spring from engaging with the lamp socket, thereby permitting of an easy application of the lens to the lamp socket or removal from it.

To apply the lens the bulb is first removed from the lamp socket and the casing and lens applied to it after which the socket is attached to the mirror in the usual manner. The lamp socket should be so adjustably secured to the mirror as to bring the filament or source of light into such position relatively to the mirror as to insure a proper projection of the rays of light from the upper half of the mirror. When this is done the lens will insure a proper projection of the rays from the lower half of the mirror.

Having thus fully described my invention, I claim and desire to secure by Letters Patent of the United States:—

1. In a light-projecting headlight for automobiles, the combination with a reflector, of a source of light arranged in front of the reflector whereby the rays of light issuing therefrom will fall directly upon a substantial half portion of the reflector and be reflected thereby, and a transparent member of some light-refracting material interposed between the source of light and the other substantial half portion of the reflector whereby rays issuing from the source of light passing therethrough will be refracted and the direction thereof changed before engaging said other portion of the reflector to be reflected by it, said refracting member being so arranged that the rays of light reflected from said other portion of the reflector will project forward therefrom without passing through said refracting member.

2. In a light-projecting headlight for automobiles, the combination with a reflector and a source of light arranged in front of the reflector, of a transparent light-refracting member interposed between the source of light and a substantial half portion of the reflector whereby rays from the source of light passing through the refracting member will be refracted and the direction thereof changed before engaging said substantial half portion of the reflector to be reflected by it, said refracting member being arranged whereby the light reflected from said half portion of the reflector will project forward therefrom without passing through said refracting member.

3. In a light-projecting headlight for automobiles, the combination of a reflector, a source of light in front of the reflector, a transparent member of some light-refracting material interposed between the source of light and the reflector whereby rays of light passing therethrough will be refracted and the direction thereof changed before striking said reflector to be reflected by it, said source of light and said refracting member being so arranged relatively to one another and to the reflector that a portion of the rays issuing from the source of light will be reflected by the reflector in a general direction substantially parallel with the axis of the reflector and other rays will be projected downwardly in a general direction away from the axis of the reflector.

4. In a light-projecting headlight for automobiles, the combination with a reflector, of a source of light arranged in front of the reflector whereby rays of light therefrom will fall directly upon the upper substantial half of the reflector and be reflected thereby, a transparent light-refracting member interposed between the source of light and the substantial lower half of the reflector whereby rays from the source of light passing through said refracting member will be refracted and pass in a changed direction onto the surface of the substantial lower half of the reflector and thence be reflected thereby in a general downward direction away from the axis of the reflector and without again passing through the refracting member, and means for supporting the refracting member.

5. In a light-projecting headlight for automobiles, the combination with a reflector and a source of light, of a transparent refracting lens interposed between the source of light and the reflector, said refracting lens presenting on the interior a smooth, rounding, continuous surface and upon the exterior a series of short, inclined, step-forming surfaces.

6. In a light-projecting headlight for automobiles, the combination with a reflector and a source of light arranged in front of said reflector, of a transparent refracting member interposed between the source of light and the lower half of the reflector, whereby rays from the source of light may pass through the refracting member and be refracted to pass in a changed direction onto the surface of the lower half of the reflector and thence reflected thereby in a general downward direction without again passing through the refracting member, and means for supporting said refracting member.

7. The combination in a non-glare headlight of a source of light and a reflector with a refracting means located between the source and the reflector for redirecting before reflection certain of the light rays in such a direction that they are reflected below their normal course.

8. Projection apparatus comprising a concave reflector, a light source at the focus of the reflector, the reflector being so shaped and positioned as to project a concentrated beam of light horizontally, and refracting means for so deflecting a portion of the light emanating from the light source that it strikes the reflector at such angles as to be reflected downwardly.

9. Projection apparatus comprising a concave reflector, a light source at the focus of the reflector, the reflector being so shaped and positioned as to project a concentrated beam of light horizontally, and refracting means partially surrounding the light source for so deflecting the light emanating to substantially that portion of the reflector lying on one side of a horizontal plane containing the axis of the reflector that it is reflected downwardly.

10. Projection apparatus comprising a substantially paraboloidal reflector, a light source so positioned with relation to the focus of the reflector as to project in and below a horizontal direction a concentrated beam of light from at least substantially that portion of the reflector lying on one side of a horizontal plane containing its axis, and means for so refracting light to the other portions of the reflector that it is projected downwardly.

11. Projection apparatus comprising a concave reflector, a light source at the focus of the reflector, and concave means partially surrounding the light source for so refracting light to the reflector that it is reflected downwardly, the refracting means having a succession of sloping surfaces so that it may be positioned in a restricted space between the light source and the reflector.

12. Projection apparatus comprising a concave reflector, a lamp having a light source at the focus of the reflector, a lamp socket, a refractor for refracting light from the source to the reflector, and means for mounting the refractor on said socket between the light source and the reflector.

JOHN E. RYAN.